United States Patent [19]
Kraus et al.

[11] 3,912,838
[45] Oct. 14, 1975

[54] PNEUMATIC APPLICATION OF LIGHTWEIGHT CEMENTITIOUS COMPOSITIONS

[75] Inventors: John Walter Kraus, Glenwood; Preston Leonard Veltman, Severna Park; Casimer Claudius Legal, Elkridge, all of Md.

[73] Assignee: W. R. Grace & Co., New York, N.Y.

[22] Filed: July 25, 1973

[21] Appl. No.: 382,612

[52] U.S. Cl. .................. 427/426; 106/88; 427/373; 427/421
[51] Int. Cl.² ...................... B05D 1/34; B05D 1/36
[58] Field of Search........ 117/104 R, 105.5; 106/88; 427/426, 373; 421

[56] References Cited
UNITED STATES PATENTS

| | | | |
|---|---|---|---|
| 2,161,553 | 6/1939 | Westberg et al. | 259/151 |
| 2,864,714 | 12/1958 | Dixon et al. | 106/88 |
| 2,921,862 | 1/1960 | Sucetti | 106/88 X |
| 2,993,016 | 7/1961 | Sucetti | 106/88 X |
| 3,035,940 | 5/1962 | Hobson | 117/105.5 X |
| 3,077,415 | 2/1963 | Ayres | 106/88 X |
| 3,093,505 | 6/1963 | Conway | 117/104 R |
| 3,138,472 | 6/1964 | Sommer | 106/88 |
| 3,522,069 | 7/1970 | Checko et al. | 106/88 |
| 3,758,319 | 9/1973 | Ergene | 106/88 |
| R23,908 | 12/1954 | Mollo | 106/88 X |

*Primary Examiner*—William D. Martin
*Assistant Examiner*—Shrive P. Beck
*Attorney, Agent, or Firm*—Joseph P. Nigon

[57] ABSTRACT

Method for pneumatically applying lightweight hydraulic cementitious compositions in which the cementitious binder and lightweight aggregate are pre-granulated with a portion of the total water of hydration prior to introduction into the pneumatic conveying and applying means. Remaining water of hydration is added near the exit end of the conveying and applying means in the form of a foam. Use of a copious foam and less than normal amounts of total water permits one to obtain relatively quick setting products having very low dry density, after curing and drying.

3 Claims, No Drawings

PNEUMATIC APPLICATION OF LIGHTWEIGHT CEMENTITIOUS COMPOSITIONS

This invention relates to procedures for pneumatic application of lightweight hydraulic cementitious compositions. In one particular embodiment it relates to procedures for pneumatically applying such compositions in a manner which provides very low density cured products.

A wide variety of hydraulic cementitious compositions are known in the art. These comprise a blend of aggregate such as sand or gravel and a cementitious binder which, when mixed with water, forms a flowable, formable plastic mass that slowly hardens (over a period of days) to a strong rocklike product. Well known examples of such hydraulic cementitious binders include cement (e.g., Portland cement), calcined gypsums (e.g., plaster of Paris), various lime products such as that known as hydraulic lime or mixtures of such binder materials. In preparing the so-called lightweight or insulating hydraulic cementitious compositions some or all of the typical dense aggregate such as sand is replaced with materials known as lightweight aggregate. Typical lightweight aggregate materials employed include expanded vermiculite, expanded perlite, flyash, expanded shale, expanded Haydite, expanded clay, and other like materials, and/or blends or mixtures thereof. Other typical additives, e.g., set retarders or set accelerators; air entraining agents and the like may also be present in the hydraulic cementitious compositions. One typical example of the prior art or lightweight insulating hydraulic cementitious compositions is U.S. Pat. No. 3,042,681, granted July 3, 1962. French Pat. No. 1,475,265 (1967) describes fluid colloidal mortars comprising water, a binder such as cement, and high amounts of filler such as vermiculite or perlite or mixtures thereof. These mortars are said to be suitable for making exterior or interior insulating coatings by projection onto the surface to be coated.

It is also known in the prior art to pneumatically apply cementitious compositions at a point of use remote from the place where the raw materials are mixed. One suitable apparatus for this purpose is known as the "Allentown Pneumatic Gun" as fully described in the Instruction Manual and Parts Catalog therefor designated as 0035-1969 (Copyright 1961 by Allentown Pneumatic Gun Company, Allentown, Pennsylvania). The construction and operation of this apparatus is schematically shown at page 318 in an article by J. F. Wygant, entitled "Pneumatic Gun Operating Variables Affecting Castable Refractories" appearing at pages 317 et seq. of the American Ceramic Society Bulletin, Vol. 42, No. 5 (1963). Another suitable apparatus for pneumatically applying cementitious materials is described in U.S. Pat. No. 2,161,553, granted June 6, 1939.

It has now been found in accordance with the present invention that quick setting lightweight cementitious coatings can be produced by pneumatically applying a granulated preblend of hydraulic cementitious binder and lightweight aggregate with controlled fractions of the total water of hydration, and adding the remaining water of hydration to the granulated solids in the form of a foam just prior to application to the surface to be coated. By increasing the proportion of lightweight aggregate and/or using a copious foam providing less than normal amounts of total water of hydration one obtains relatively quick setting very lightweight cured products.

Pregranulation of cementitious binder and lightweight aggregate with a portion of the total water of hydration is a critical step in the present invention. Granulation is achieved by adding a portion of the water, needed for hydration, to the dry mix and tumbling the materials to form pellets of damp mix. Water may be added in one of several ways: (1) water is sprayed onto dry lightweight aggregate (e.g., expanded vermiculite), tumbled in a mixer after which cementitious binder (e.g., Portland cement) is added and tumbling continued until the ingredients form granules or pellets of dampened mix; (2) water is sprayed into a dry mixture of binder and aggregate and the damp mixture tumbled until granules are formed; or (3) water and binder are added simultaneously to the rolling aggregate in a cement mixer and tumbling is continued until granules are formed. Granule grain size is governed by the amount of water added, ratio of binder to aggregate, tumbling time, speed of tumbling and rate of water addition. If desired, as stated above, the granulated blends of binder and aggregate may contain other typical ingredients such as set retarders, set accelerators, air entraining agents, and the like. Typically the compositions used in the practice of the present invention will have a binder to aggregate volume ratio of 1:3 to 1:20, e.g., 1:5 to 1:10.

The amount of water used in the granulation step is critical. For example, in applying the invention to a known commercially available lightweight insulating concrete composition (currently used in slurry form for the formation of floors or roof decks) and containing No. 1 Portland cement (94 pounds per cubic foot) and No. 3 expanded vermiculute aggregate (7 pounds per cubic foot) in a 1 to 6 volume ratio it has been observed that the water used for pre-granulation should range from about 0.5 to about 1.0 gallons per cubic foot of aggregate. If less than about 0.5 gallon of water is used the product ingredients tend to segregate, and the material is very dusty and suffers from rebound problems when pneumatically applied. If more than about 1.0 gallon of water is used one encounters plugging problems in the feed hopper and/or the conveying hose of the pneumatic application equipment because of premature setting of the cement binder. In one test run it was observed that plugging occurred in 5 minutes if 1.5 gallons of water per cubic foot of vermiculite aggregate is used. Those skilled in the art will be readily able to determine by routine experiment the appropriate ranges for water of granulation when applying the invention to other lightweight hydraulic cementitious compositions.

Further water of hydration for the lightweight cementitious composition is added in the form of a foam at the nozzle of the pneumatic applicator hose, just before spraying the final wet product onto the surface to be coated. In accordance with this invention the total water of hydration in the final product as applied (i.e., the water used in pregranulation plus the water in the aqueous foam blended with the granules at the hose nozzle) is less than that normally used in current practice. For example, with the Portland cement-expanded vermiculite (1:6 volume ratio) composition referred to above the total water used in the practice of the present invention ranges from about 2 to about 3 gallons per cubic foot of aggregate, in contrast with the currently employed 3.5 to 4.0 gallons per cubic foot. The reduction in water requirements resulting from the practice of this invention provides significantly reduced initial set time (time required to provide penetrometer hardness of 10 pounds per square inch) and total cure time (time required to produce maximum compressive strength). Greater amounts of total water result in slumping problems when the product is applied to vertical or overhead surfaces, and/or longer initial set time.

The water mixed with pregranulated binder-aggregate compositions at the hose nozzle of the pneumatic application equipment is added as a foam to obtain the optimum porosity and dry density in the final cured product. A strong foam is needed to reduce the tendency to collapse under the force of application, and resultant compaction of the applied product. The foam can be produced by dissolving any suitable surface active agent in the nozzle water and aerating the solution prior to introduction into the nozzle where it is mixed with the granules and sprayed. To date the best and most reliable results have been achieved through the use of a commercially available foam generator (Waukesha Foam Generator — Model 310, Waukesha Foundry Company, Inc., 1300 Lincoln Avenue, Waukesha, Wisconsin 53186) and a commercially available foaming agent known as "Thermofoam" (formerly "Agrifoam"). "Thermofoam" is a protein based air entraining agent.

The pneumatically applied lightweight cementitious compositions described herein can be applied to horizontal or vertical surfaces and, under proper conditions, to overhead surfaces. The products adhere strongly to paper, wood, plastic or metal surfaces and are readily applied in desired coating thicknesses of up to several inches.

The invention will be further understood from the following illustrative specific examples. In these runs the pneumatic application equipment used was a Model N-O Allentown Pneumatic Gun like the N-OO model described in the above-mentioned American Chemical Society Bulletin and having the following detailed specifications:

| | |
|---|---|
| Material Feed Rate | 0.67 cubic feet per minute |
| Feed Motor Speed | 40 revolutions per minute |
| Tank Air Pressure | 18 pounds per square inch gauge |
| Material Hose Air Pressure | 10 pounds per square inch gauge |
| Material Hose Diameter | 1 inch |
| Material Hose Length | 50 feet |
| Nozzle Diameter | 1 inch |
| Nozzle Length | 6 inches |
| Nozzle Water Ring: | |
| Orifice Size | 3/16 inch (8 holes) |
| Linear Air Velocity at Nozzle Outlet | 1900 feet per minute per square inch |

Instead of the usual water line to the gun nozzle a Model 310 Waukesha Foam Generator was connected to the nozzle water inlet. This particular foam generator had a generator head number of 1.5, a pump speed of 4,000 revolutons per minute, and a water pumping rate of 1.0 gallon per minute. When supplied with water containing 0.83 grams per liter of the above-described "Thermofoam" foaming agent it gave a foam expansion ratio of 7.7 to 1 (volume ratio of foam generated to water supplied).

The solid feed material to the pneumatic gun was a pregranulated blend of No. 1 Portland cement and No. 3 expanded vermiculite aggregate in a 1:6 volume ratio. Separate batches of the dry materials were uniformly blended together in a cement mixer and then sprayed with water in an amount equal to one gallon per cubic foot of vermiculite aggregate. Mixing and tumbling was continued until granules approximately one-sixteenth inch to one-fourth inch in diameter were formed. The damp but relatively dry granules were transferred to the feed tank of the pneumatic gun, conveyed through the air hose, mixed with foam (from the foam generator) in the hose nozzle and then sprayed on a vertical stainless steel panel as well as on a horizontal surface. The sprayed material was "dry," and adhered to vertical and horizontal surfaces without slump, run-off or rebound. Coatings an inch thick were easily built up. Certain properties are given in the following Table 1.

TABLE 1

| | EXAMPLE | |
|---|---|---|
| | 1 | 2 |
| Total water (gallons per cubic foot aggregate) | 2.35 | 2.55 |
| Foamed water (gallons per cubic foot aggregate) | 1.35 | 1.55 |
| Wet Density (pounds per cubic foot) | 40.9 | 40.9 |
| Percent Weight Loss on Drying | 37.3 | 40.3 |
| Dry Density (pounds per cubic foot) | 25.6 | 24.4 |
| Yield* | 1.04 | 1.08 |
| Hours to reach 10 pounds per square inch by soil penetrometer test | 1 | 3 |
| Final Compressive Strength (Pounds per square inch - ASTM C 495) | 175 | 160 |

*Yield equals the weight of all material mixed with one cubic foot of aggregate divided by the wet density of the product.

EXAMPLE 3

In another run using the same equipment and procedures generally described above the invention was used to prepare and apply a lightweight product in which the volume ratio of expanded vermiculite to cement binder was 8 to 1. This material, after pre-granulation, was also sprayed on a vertical surface with excellent results, i.e., good adherence with no slump, run-off or rebound. Other details are shown in the following Table 2.

TABLE 2

| | EXAMPLE 3 |
|---|---|
| Water Used for Granulation* | 0.7 |
| Foamed Water* | 1.8 |
| Total Water* | 2.5 |
| Wet Density | 41.5 |
| Percent Weight Loss on Drying | 48.1 |
| Dry Density | 21.6 |
| Hours to Reach 10 psi by Soil Penetrometer | 6 |
| Final Compressive Strength | 135 |

*in gallons per cubic foot of aggregate

What is claimed is:

1. A method for applying lightweight cementitious compositions to a surface comprising the steps of:
   a. blending and pre-granulating portland cement and vermiculite in a volume ratio of from 1:3 to about 1:20 with a portion of the total water needed for hydration, which constitutes from 0.5 to 1.0 gallons of water per cubic foot of vermiculite, to form damp and relatively dry granules;

b. pneumatically conveying the pre-granulated blend to an application spray nozzle;
c. adding the remaining portion of the total water needed for hydration to the granules in the spray nozzle in the form of an aqueous foam to provide a total water content of from 2.0 to 3.0 gallons per cubic foot of vermiculite; and
d. spraying the mixture of granules and aqueous foam upon the surface to be coated.

2. The method according to claim 1 wherein the portland cement to vermiculite volume ratio is from 1:5 to 1:10.

3. The method according to claim 1 wherein the aqueous foam has a foam ratio of about 7:1.

* * * * *